Nov. 18, 1958  R. GOTTSCHALD  2,860,899
UNIVERSAL JOINTS
Filed Aug. 31, 1955

INVENTOR
RUDOLPH GOTTSCHALD
BY
ATTORNEYS

United States Patent Office 2,860,899
Patented Nov. 18, 1958

2,860,899

UNIVERSAL JOINTS

Rudolf Gottschald, Dusseldorf-Oberkassel, Germany

Application August 31, 1955, Serial No. 531,653

Claims priority, application Germany September 17, 1954

5 Claims. (Cl. 287—90)

This invention relates to a joint which is movable universally and which is especially intended for use with the steering parts of the front axles of motor vehicles, more particularly, the invention relates to joints in which the joint bolt or pin is mounted in the joint casing by means of a ball member which rests in a corresponding ball-socket in the casing, a lining cup being arranged in the ball-socket, which cup is connected to the ball member so as to swing with it on angular movement, but to permit a rotation of the joint bolt or pin about its axis.

In articulated joint construction for use in the steering mechanisms of automobiles, it is generally desired to utilize a construction wherein the joint offers less frictional resistance to rotation of the ball member in the ball socket than to angular movement. Many different types of joint construction have been proposed to effect this, although none have been completely satisfactory. One of the more common of these joint constructions utilizes a ball member comprising a section of a sphere mounted on the joint stem and mounted in the joint casing. This ball member is received in a hollow spherical cup in the joint casing and this spherical cup is provided with an aperture through which the joint stem passes. This aperture is large enough to permit rotation of the ball member without rotation of the cup, but is small enough to carry the cup with the ball member when the stem is moved angularly. While this has the desired effect of providing different bearing surfaces for rotational and angular movements, it has the disadvantage that the joint stem stresses the cup in a distending manner during angular deflections, so as to eventually damage the cup, particularly where the cup is made of a non-metallic friction-reducing material having a small wall thickness.

According to this invention a joint of the foregoing type is provided wherein the aperture in the spherical cup has a diameter exceeding that of the joint stem or neck and wherein the ball member has a portion extending over the edge of the spherical cup. When the stem is moved angularly, this extending member engages the upper edge of the cup to move the cup without the stem engaging the edge of the aperture. In this simple manner it is possible to simultaneously obtain the advantages of the use of different bearing surfaces for angular and rotational movement while eliminating difficulties heretofore encountered because of inaccuracies in fabrication. In addition, the spherical cup may be made of selected resilient materials such as synthetic materials of high resistance to wear, which materials possess highly satisfactory sliding properties, without the disadvantage that this material might be subject to damage by continual and repeated engagement with the stem.

It is accordingly a primary object of the present invention to provide a ball and socket joint utilizing a hollow spherical cup between the ball and socket wherein angular and rotational movements of the ball and its associated stem do not cause wear over the same bearing surfaces, while at the same time preventing engagement of the stem with the spherical cup.

These and further objects and advantages of the invention will become more apparent upon reference to the following specification and claims and appended drawings wherein:

Figure 1:
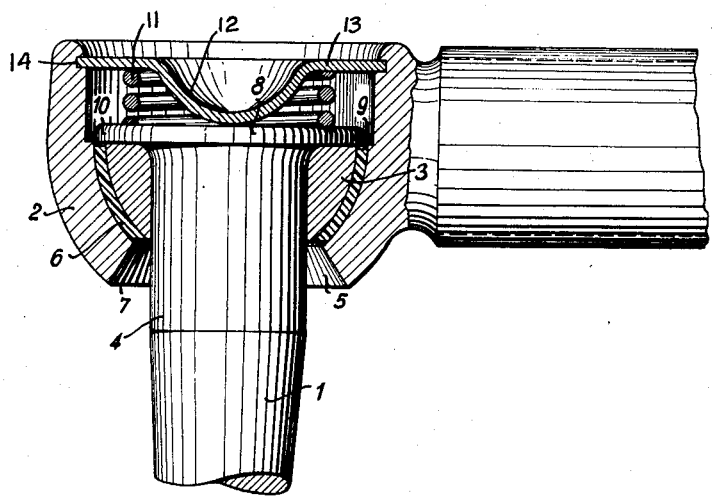
Fig. 1 shows in vertical section an example of a joint in which the ball-section forms an independent insertion-part.

Referring more particularly to the figures of the drawing, there is shown in Figure 1 a ball and socket joint comprising a joint stem 1 which terminates in a cylindrical portion 4. Surrounding he cylindrical portion 4 of joint stem 1 is a generally hemispherical insertion member 3 having a height which is less than that of the radius of the socket. The cylindrical portion 4 of the joint stem 1 terminates in a shoulder 8 which overlies the insertion member 3 and which extends beyond the edges of such member.

While the shoulder shown in Figure 1 is integrally formed with the cylindrical portion 4, it is also contemplated that this shoulder may consist of a disc which is secured to the cylindrical portion by means of one or more screws. The diameter of the shoulder 8 does not exceed the diameter of the casing and the edges 10 of the shoulder may be broken or rounded.

The insertion member 3 and shoulder 8 are received within a joint casing generally indicated at 2 having a hemispherical socket therein. The casing is provided with an aperture 5 in the bottom thereof through which the cylindrical portion 4 of joint stem 1 extends. A hollow spherical cup 6 is mounted between the socket in the casing 2 and the insertion member 3 and is provided with an aperture 7 in the bottom thereof through which the cylindrical portion 4 extends. The diameter of this aperture in the bottom of the spherical cup exceeds the diameter of the cylindrical stem portion 4 so as to permit angular movement of the joint stem without engagement of the cylindrical portion with the edge of the aperture 7.

The upper edge 9 of the spherical cup 6 lies slightly below the edge of the shoulder 8 in order to compensate for possible inaccuracies in construction. The joint is completed by means of a coil spring 11 having one end engaging the flat surface of collar 8 and having another end seating over a protrusion 12 in a closure member 13 which is secured to the edge of the casing at 14.

On angular movement of the joint stem 1, the edge 10 of collar 8 engages the upper edge 9 of the spherical cup 6 so as to cause the cup to move with the joint stem. Because of this engagement, the aperture 7 is not drivingly engaged by the cylindrical portion 4 and is not damaged thereby even after long periods of use.

The upper end of the cylindrical portion 4, the collar 8 and the insertion member 3 may be considered to form the ball joint and it will be noted that the driving connection between the ball and the spherical cup is effected by providing a reduced diameter of ball below the collar 8. The diameter of the collar 8 is greater than the internal diameter of the spherical cup 6, while the diameter of the insertion member 3 is substantially equal to the internal diameter of the spherical cup 6. It will also be apparent to those skilled in the art that the reduction in diameter may also be multiple so that the hollow spherical cup is associated with the ball by means of surfaces reduced in step fashion.

It will also be apparent that while the upper edge of the spherical cup and the lower edge of the shoulder 8 engage simply in abutting relation in Figure 1, the under surface of the shoulder 8 may be provided with a peripheral recess concentric with the cylindrical portion 4, in which recess a correspondingly shaped projection of the spherical cup engages. The surface of the shoulder adjoining such recess, as well as the peripheral recess, and the surface of the spherical cup adjoining the projection may be conveniently rounded.

While the cylindrical portion 4 is shown as passing through the insertion member 3 in Figure 1, it will be understood by those skilled in the art that it is also possible to utilize a bushing between these members, which bushing may be made of friction reducing material, such as synthetic materials based on polyamide or superpolyamide or the like. By a suitable choice of the sizes of the bearing surfaces which are in contact and relatively movable, the friction and adhesion at the inner surface of the spherical cup may be related to the friction and adhesion of the outer surface of the spherical cup so that the cup will not follow the rotary movements of the joint stem about its axis.

In order to achieve different sizes of contacting surfaces, the curvature of the ball of the joint may deviate from the curvature of the hollow spherical surface of the casing while maintaining complete contact on the lining cup by appropriate formation of the latter. This is preferably effected by displacing the centers of curvature of the two surfaces with respect to one another. Where the displacement of the center of curvature of the ball with respect to the center of curvature of the hollow spherical surface of the casing is effected towards the side of the casing closure 13, the ball surface, which rests in the spherical cup 6, may be reduced to a value of zero. The spherical cup may conveniently be comprised of a more or less resilient synthetic material of large slidability and large resistance to wear, particularly a synthetic material based on polyamide and on superpolyamide or poly-addition products such as the commercial product known as "Vulkolane."

Figure 2:
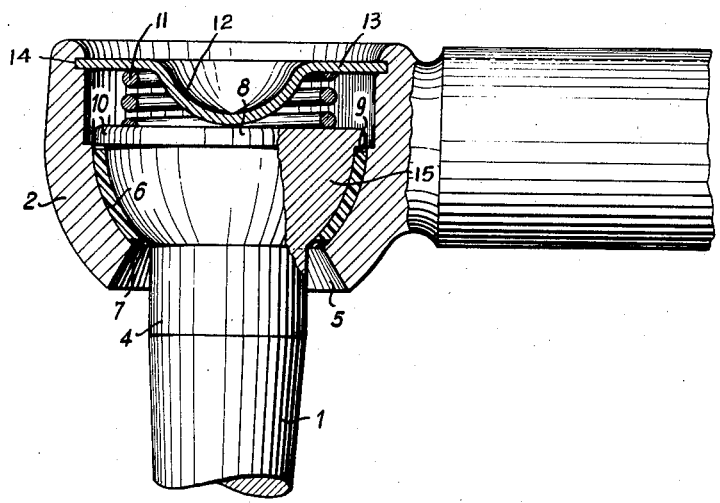
Fig. 2 is a similar view of another example, in which the ball-member or part is made integral with the joint-bolt or pin.

While the embodiment of the invention shown in Figure 1 utilizes a ball comprised of a cylindrical portion passing through an insertion member, it is also contemplated that a unitary ball may be used. Referring to Figure 2, there is shown a joint constructed in this manner wherein similar parts are indicated by similar reference numerals. According to this embodiment of the invention, the joint stem 1 has a cylindrical portion 4 which terminates in a semi-cylindrical ball 15 which is received in the hemispherical cup 6. The upper portion of the ball 15 terminates in a collar 8 of the same type as shown in the embodiment of the invention illustrated in Figure 1. The operation of this device is similar to that illustrated in Figure 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A joint assembly comprising a housing having a hollow spherical inner wall having an aperture therein, a stem passing through said aperture and carrying a ball member at the end thereof in said housing, a generally hemispherical lining cup in said housing between and in engagement with said inner wall and said ball member, said lining cup having an aperture therein through which said stem passes, said last named aperture being of a greater diameter than said stem to provide clearance therebetween, and a collar member on said ball overlying the upper edge of said cup so that said collar engages said edge of said cup for movement of said cup within said housing on angular movement of said stem.

2. A joint assembly comprising a housing having a hollow spherical inner wall having an aperture therein, a stem passing through said aperture and carrying a ball member at the end thereof in said housing, said ball member having a spherical surface of a radius less than the radius of said spherical inner wall to provide a clearance therebetween, a generally hemispherical lining cup movably received in said clearance in engagement with said ball member and said inner wall, said lining cup having an aperture therein through which said stem passes, said last named aperture being of a diameter greater than the diameter of said stem to provide clearance therebetween, and a circular collar member on said ball member, said collar member having a diameter greater than the diameter of said ball member and of the surface of said lining cup in engagement therewith so that the edge of said collar member engages the edge of said cup for movement of said cup within said housing on angular movement of said stem.

3. A joint assembly as set out in claim 2 wherein said stem has a cylindrical portion extending into said lining cup, and ring like insertion member encircling said cylindrical portion and having a spherical surface forming said spherical surface of said ball member, said collar member engaging one end of said insertion member, the maximum diameter of said insertion member being less than the diameter of said collar member.

4. A joint assembly as set out in claim 2 wherein said ball member comprises a hemispherical member formed unitarily with said stem as an integral part thereof, and said collar member comprises a flange extending from the end of said hemispherical member.

5. A joint assembly as set out in claim 2 wherein the spherical surface of said ball member and the spherical surface of said ball member and the spherical surface of said inner wall are concentric, the diameter of said collar member being no greater than the diameter of the spherical surface of said inner wall.

References Cited in the file of this patent
UNITED STATES PATENTS

| | | |
|---|---|---|
| 2,126,389 | Hufferd | Aug. 9, 1938 |
| 2,189,266 | Klages | Feb. 6, 1940 |
| 2,425,138 | Venditty | Aug. 5, 1947 |
| 2,471,672 | Booth | May 31, 1949 |

UNITED STATES PATENT OFFICE

CERTIFICATE OF CORRECTION

Patent No. 2,860,899                                            November 18, 1958

Rudolf Gottschald

It is hereby certified that error appears in the printed specification of the above numbered patent requiring correction and that the said Letters Patent should read as corrected below.

Column 2, line 16, for "he" read -- the --; column 4, lines 49 and 50, strike out "and the spherical surface of said ball member".

Signed and sealed this 10th day of February 1959.

(SEAL)
Attest:

KARL H. AXLINE                                                      ROBERT C. WATSON

Attesting Officer                                               Commissioner of Patents